(12) United States Patent
Dawari et al.

(10) Patent No.: US 11,061,502 B2
(45) Date of Patent: Jul. 13, 2021

(54) SELECTION OF A GRAPHICAL ELEMENT WITH A CURSOR IN A MAGNIFICATION WINDOW (71) Applicant: DASSAULT SYSTEMES, Velizy Villacoublay (FR)

(72) Inventors: Avinash Dawari, Dhayari (IN); Sameer Garde, Pashan (IN)

(73) Assignee: DASSAULT SYSTEMES, Velizy Villacoublay (FR)

( * ) Notice: Subject to any disclaimer, the term of this patent is extended or adjusted under 35 U.S.C. 154(b) by 36 days.

(21) Appl. No.: 14/984,793

(22) Filed: Dec. 30, 2015

(65) Prior Publication Data
US 2016/0188175 A1 Jun. 30, 2016

(30) Foreign Application Priority Data
Dec. 31, 2014 (EP) .................................... 14307221

(51) Int. Cl.
*G06F 3/041* (2006.01)
*G06F 3/0484* (2013.01)
(Continued)

(52) U.S. Cl.
CPC .......... *G06F 3/0416* (2013.01); *G06F 3/0482* (2013.01); *G06F 3/0488* (2013.01);
(Continued)

(58) Field of Classification Search
CPC ............... G06F 3/04842; G06F 3/0488; G06F 3/04883; G06F 3/0482; G06F 3/04812; G06F 3/0416
See application file for complete search history.

(56) References Cited

U.S. PATENT DOCUMENTS 5,731,801 A * 3/1998 Fukuzaki ............... G06F 3/0482
345/179
6,025,841 A * 2/2000 Finkelstein ........... G06F 3/0481
715/803
(Continued)

FOREIGN PATENT DOCUMENTS

CN 101963839 A 2/2011
CN 103136180 A 6/2013
(Continued)

OTHER PUBLICATIONS

Extended European Search Report dated Jun. 18, 2015 in European Patent Application No. 14307221.3.
(Continued)

*Primary Examiner* — Justin R. Blaufeld
(74) *Attorney, Agent, or Firm* — Oblon, McClelland, Maier & Neustadt, L.L.P.

(57) ABSTRACT

A computer-implemented method for selecting a graphical element displayed on a touch-sensitive display. The method comprises displaying a graphical element on the touch-sensitive display; detecting a first location of a first user interaction on the touch-sensitive display; displaying a window on the display, the window comprising a pointer for selecting a graphical element; rendering in the window an area surrounding the first location of the first user interaction; detecting a second user interaction on the touch-sensitive display; detecting a move of the second user interaction on the touch-sensitive display; and moving the pointer within the window according to the move of the second user interaction.

13 Claims, 4 Drawing Sheets

(51) Int. Cl.
*G06F 3/0481* (2013.01)
*G06F 3/0482* (2013.01)
*G06F 3/0488* (2013.01)

(52) U.S. Cl.
CPC ...... *G06F 3/04812* (2013.01); *G06F 3/04842* (2013.01); *G06F 3/04883* (2013.01); *G06F 2203/04805* (2013.01); *G06F 2203/04808* (2013.01)

(56) References Cited

U.S. PATENT DOCUMENTS

| | | | | |
|---|---|---|---|---|
| 6,392,675 | B1 * | 5/2002 | Becker | G06F 3/04812 715/856 |
| 8,542,397 | B2 * | 9/2013 | Yamaguchi | G03G 15/502 358/1.18 |
| 2004/0196267 | A1 * | 10/2004 | Kawai | G06F 3/04842 345/173 |
| 2005/0204305 | A1 * | 9/2005 | Keely, Jr. | G06F 3/04883 715/781 |
| 2007/0038955 | A1 * | 2/2007 | Nguyen | G06F 3/0488 715/804 |
| 2007/0247435 | A1 * | 10/2007 | Benko | G06F 3/0488 345/173 |
| 2007/0300182 | A1 * | 12/2007 | Bilow | G06F 3/0488 715/799 |
| 2010/0079498 | A1 | 4/2010 | Zaman et al. | |
| 2010/0235726 | A1 * | 9/2010 | Ording | G06F 1/1626 715/234 |
| 2011/0018804 | A1 * | 1/2011 | Homma | G06F 3/017 345/158 |
| 2011/0078624 | A1 * | 3/2011 | Missig | G06F 3/04886 715/802 |
| 2011/0093822 | A1 * | 4/2011 | Sherwani | H04L 67/38 715/863 |
| 2011/0141031 | A1 * | 6/2011 | McCullough | G06F 3/0481 345/173 |
| 2011/0141043 | A1 * | 6/2011 | Soubrie | G06F 3/04883 345/173 |
| 2011/0164060 | A1 * | 7/2011 | Miyazawa | G06F 3/0488 345/660 |
| 2012/0117505 | A1 * | 5/2012 | Koch | G06F 3/04886 715/773 |
| 2014/0026097 | A1 * | 1/2014 | Crohas | G06F 3/04842 715/810 |
| 2014/0071063 | A1 * | 3/2014 | Kuscher | G06F 3/04883 345/173 |
| 2014/0118781 | A1 * | 5/2014 | Kobayashi | G06F 3/0486 358/1.15 |
| 2014/0137051 | A1 | 5/2014 | Homma et al. | |
| 2014/0372939 | A1 | 12/2014 | Parker et al. | |
| 2015/0205522 | A1 * | 7/2015 | Zeng | G06F 3/04817 715/847 |
| 2015/0346994 | A1 * | 12/2015 | Chanyontpatanakul | G06Q 30/0641 715/828 |
| 2017/0160914 | A1 * | 6/2017 | Niranjani | G06F 3/04842 |
| 2018/0239519 | A1 * | 8/2018 | Hinckley | G06F 3/04845 |

FOREIGN PATENT DOCUMENTS

| | | |
|---|---|---|
| CN | 103513908 A | 1/2014 |
| CN | 103547988 A | 1/2014 |
| CN | 103631489 A | 3/2014 |
| EP | 2 755 124 A1 | 7/2014 |
| GB | 2 355 086 A | 4/2001 |
| JP | 6-282368 A | 10/1994 |
| JP | 2004-310219 A | 11/2004 |
| JP | 2007-072233 A | 3/2007 |
| JP | 2010-146279 A | 7/2010 |
| JP | 2010146279 A * | 7/2010 |
| JP | 2010165291 A * | 7/2010 |
| JP | 2011-028366 A | 2/2011 |
| JP | 2012-521048 A | 9/2012 |
| JP | 2012178175 A * | 9/2012 |
| JP | 2014-516435 A | 7/2014 |
| KR | 2014-0031254 A | 3/2014 |

OTHER PUBLICATIONS

Office Action dated Nov. 25, 2019 in corresponding Chinese Patent Application No. 201511018720.1 with English Translation.
Office Action dated Dec. 24, 2019 in corresponding Japanese Patent application No. 2015-255022 with English Translation.
Office Action dated Feb. 8, 2021 in corresponding Chinese Patent Application No. 201511018720.1 with English Translation.

* cited by examiner

SELECTION OF A GRAPHICAL ELEMENT WITH A CURSOR IN A MAGNIFICATION WINDOW

CROSS-REFERENCE TO RELATED APPLICATIONS

This application claims priority under 35 U.S.C. § 119 or 365 to European Application No. 14307221.3, filed Dec. 31, 2014. The entire teachings of the above application(s) are incorporated herein by reference.

TECHNICAL FIELD

The invention relates generally to the technical field of computer programs and systems, and more specifically to a method of selection of a graphical element.

BACKGROUND

Graphical user interfaces (GUI) play an important role as regards the efficiency of the interactions between a user and a device such as for example personal computer, laptop, music player, cell phone, personal digital assistants. These devices execute various applications and programs which perform functions.

Usually, the user interacts with the applications and programs through menus, toolbars, icons, and other graphics which are displayed on the display device as GUI elements. For instance, in the field of computer-aided design (CAD) techniques, a number of systems and programs are offered on the market for the design of objects (or parts) or assemblies of objects, forming a product, such as the one provided by Dassault Systemes under the trademark CATIA. CAD systems allow a user to construct and manipulate complex three dimensional (3D) models of objects or assemblies of objects through the GUI.

Traditionally, operations are performed by graphical interaction with a pointer operated by the user. The pointer is displayed in the GUI of the device, and operated via a pointing device such as a mouse, a trackball, a graphic tablet, and the like. It is also possible to perform the operations via a peripheral input device such as physical buttons (e.g. push button) or a keyboard. More recently, touch-sensitive displays have been developed. They provide a new kind of interactions between the user and the device. The touch-sensitive display can detect the presence, location and the motion of an appendage on the display area; for instance a contact of the user's finger on the display. The touch-sensitive display thus provides an input interface which replaces the traditional pointing device. Furthermore, it also provides an output interface.

A touch-sensitive display comprises a touch-sensitive surface which is able to detect any contact or proximity interaction of the user with this surface. Several types of touch-sensitive display technologies have been developed, including but not limited to, resistive, surface acoustic wave, infrared, and capacitive technologies. An interaction is typically provided to the touch-sensitive display via an appendage such as a stylus, a finger .... The detection of the user interaction may be performed when the appendage is directly on contact with the touch-sensitive display—the appendage touches the display—; it may be also performed when the appendage is at a given distance from the touch-sensitive display—the appendage need not touch the display. The user interactions can therefore be performed directly on what is displayed to the user.

In general, a device comprising a touch-sensitive display does not comprise anymore a pointing device and/or peripheral input device. This can prevent the user from performing some operations which are traditionally done with a pointing device and/or peripheral input device. However, the precise selection of a graphical element displayed on the touch-sensitive screen can be very difficult with a finger, and even with a stylus. In general, precise selection is difficult using finger/pointing device alone, because the finger or the pointer device (e.g. a stylus) creates an occlusion to the area on screen that is directly in contact with the appendage as well reducing the field of vision of the user with the appendage and the holding hand that comes between the eyes and the display screen, and the user cannot see what is currently being selected. Moreover, if graphical elements to be selected are close together, it becomes more difficult for the user to precisely select a particular graphical element. This is difficult partly due to inherent jitter of fingers or appendage held by hand and partly because of inability to control movement of touch point on screen with precision greater than that of finger/pointing device movement. Typically, the touch point displacement is same as that of finger/pointing device. Another problem is that touch pointer sensitivity cannot be increased: the touch pointer movement is exactly same as finger or pointing device movement, which leads to the lack of accuracy of the touch pointer movement. A further problem is that the user has to zoom-in the view in order to do precise selection, and then has to zoom-out back to original scale to continue working; this is cumbersome operations for the user, time consuming process, and it further requires computer resources which are limited on devices with touch-sensitive displays such as tablets.

Some solutions have been developed. However, they suffer several drawbacks. Mainly, the user still encounters difficulties for moving the pointer by a pixel by using touch input, for reaching to all area of the display. Furthermore, it can be difficult for the user to correctly move the pointer when the solution uses a combination of pointer offset with pointer speed reduction. Moreover, dual finger techniques increase precision but are not user friendly; especially with solution using dual finger slider.

Thus, according to the limitations of the existing solutions shortly discussed above, there is a need for an improved method for selecting a graphical element on touch-sensitive display. Preferably, the method should improve the precision of the gesture, which should be intuitive and ergonomic for the user.

SUMMARY OF THE INVENTION

The invention therefore provides a computer-implemented method for selecting a graphical element displayed on a touch-sensitive display. The method comprises displaying a graphical element on the touch-sensitive display; detecting a first location of a first user interaction on the touch-sensitive display; displaying a window on the display, the window comprising a pointer for selecting a graphical element; rendering in the window an area surrounding the first location of the first user interaction; detecting a second user interaction on the touch-sensitive display; detecting a move of the second user interaction on the touch-sensitive display; and moving the pointer within the window according to the move of the second user interaction.

The method may further comprise:
  the move of the second user interaction comprises a move direction and a move distance, and the pointer is moved with a same move direction and with a move distance that is proportional to the move distance of the second user interaction;

the move distance of the pointer is reduced proportionally by the application of the coefficient of reduction;

selecting, upon user action, the coefficient of reduction;

after the step of moving the pointer, the steps of detecting a move of the first user interaction from the first location to a second location on the touch-sensitive display; rendering in the window the area surrounding the second location on the touch-sensitive display;

rendering in the window the area surrounding the second location on the touch-sensitive display further comprises performing, in the window, a real-time rendering of areas surrounding intermediate locations of the first user interaction while moving from the first to the second location;

moving the window according to the move of the first user interaction;

the pointer remains motionless within the window while the window moves;

the second user interaction is maintained on the touch-sensitive display;

the first user interaction is maintained on the touch-sensitive display;

after moving the pointer, the steps of: detecting the loss of the first and second user interactions; and selecting a graphical element under the pointer;

removing the window from the touch-sensitive display;

the area rendered in the window is magnified or reduced based on magnification or reduction coefficient.

It is further provided with a computer program for selecting a graphical element comprising instructions for causing a computer to take the steps of the above method.

It is also provided with a computer system for selecting a graphical element comprising a processor communicatively coupled to a memory, and a touch-sensitive display, the memory storing the above computer.

DESCRIPTION OF THE FIGURES

A system embodying the invention will now be described, by way of non-limiting example, and in reference to the accompanying drawings, where.

DETAILED DESCRIPTION

The invention is directed to a computer-implemented method for selection of a graphical element displayed on a touch-sensitive display. The method comprises a step of displaying a graphical element on the touch-sensitive display. The method also comprises a step of detecting the first location of the first user interaction on the touch-sensitive display, e.g. the user touches the screen with a finger. The method further comprises a step of displaying a window on the display. The window is preferably displayed at a certain distance offset from the first location. The window comprises a pointer for selecting one of the graphical elements displayed within the window. Moreover, the method comprises rendering in the window the area surrounding the first location of the first user interaction. The method further comprises detecting the second user interaction on the touch-sensitive display, e.g. the user touches the screen with a second finger. Then, the method comprises the detection of a displacement (or move) of the second user interaction on the touch-sensitive display, e.g. the user slides his second finger on the screen. The pointer displayed in the window is moved according to the second user interaction on the touch-sensitive display.

The method improves the selection of graphical element displayed on a touch-sensitive screen. The invention can be used for any graphical element having any size. In particular, the method of the invention allows the user to select graphical element that has a small size when displayed, e.g. does not exceed a few (2 or 3) pixels in dimension. These kind of interactions are often needed in CAD product where user needs to input precise point on screen as part of geometry construction process or has to select geometry (or part of it) among other adjacent geometries to perform some modification operation. Any kind of graphical element can be selected, e.g. point, line, face or the aggregate of these elements. The invention can be used for, e.g. select features among other features forming a model . . . . The present invention uses a secondary touch to precisely move a pointer inside a window that reproduces an area of the display surrounding the primary touch wherein the graphical element to be selected is located. While the user moves the secondary touch, the primary touch is held constant at the detected location and the view in the window of the surrounding area (showing graphical elements occluded by the primary touch) does not change. Only the pointer (which may be by default at the center of the window) moves within the window. This pointer (that may be a crosshair) represents a touch pointer and the element under this pointer is considered as being selected. The selection of the graphical element is performed in a window dedicated to that task; advantageously, the user view is no more occluded by its own finger. Hence, the user now has more precision in selection of the closely spaced graphical elements. Furthermore, the pointer is not offset from primary finger, thus all areas of screen remain accessible. Also, the pointer motion is proportional to the secondary touch and not the primary touch, thus there is lesser perception of disassociation for the user. In addition, the present invention saves time for the user which would otherwise be spent in zooming in, selecting and zooming out. Interestingly, the invention takes into effect only when needed and is not obstructing the usual workflow of the users.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the steps of selecting the coefficient of reduction (S110) and moving the second user interaction at step S160, are triggered upon user action.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physically distinct parts (e.g. one for the program, and possibly one for the database).

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or a set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the present invention, the selectable graphical elements may be stored on a database.

Figure 8:
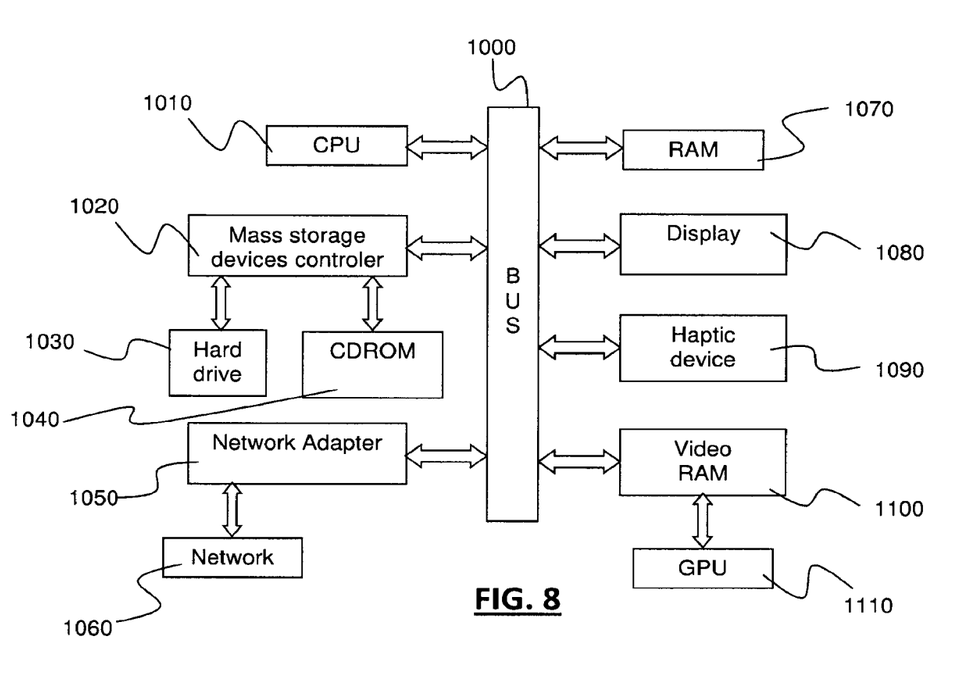
FIG. 8 shows an example of a system for performing the invention.

FIG. 8 shows an example of a system for performing the method of the invention. The system is typically a computer, e.g. a tablet. The computer of FIG. 8 comprises a central processing unit (CPU) 1010 connected to an internal communication BUS 1000, a random access memory (RANI) 1070 also connected to the BUS. The computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The computer may also include a haptic device 1090 such as pointer control device (also referred to as cursor control device) or the like. A pointer control device is used in the computer to permit the user to selectively position a pointer (also referred to as cursor) at any desired location on the touch-sensitive display 1080. The touch-sensitive display (also referred to as touch screen) is a hardware display unit attached to a computer which responds to touch made on its front surface. It can support 1, 2 or multiple simultaneous touches. In addition, the pointer control device allows the user to select various commands, and input control signals. The pointer control device includes a number of signal generation devices for input control signals to system.

Typically, a pointer control device on a touch-sensitive display is an appendage that may be, but is not limited to, a finger, a stylus. In the context of a touch-sensitive display, the haptic device 1090 (a touchscreen sensor and its accompanying controller-based firmware) are integrated on the display.

The present invention can be implemented by a computer program. The computer program comprises instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Figure 1:
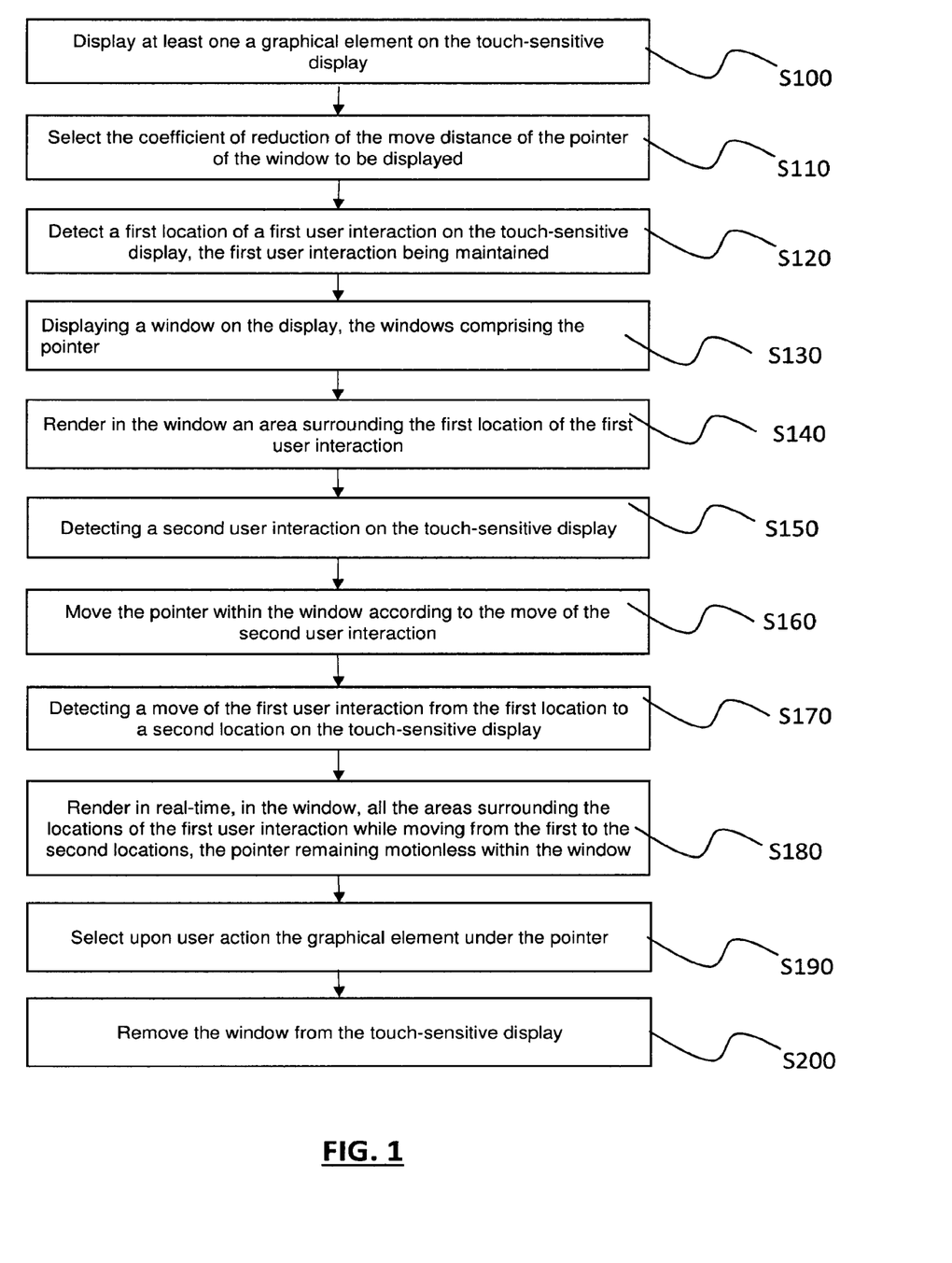
FIG. 1 is a flowchart showing an example of the invention.

Referring now to FIG. 1, at step S100, at least one graphical element is displayed on the touch-sensitive display by the system, e.g. the display 1080 of FIG. 8. The display of the object is performed as known in the art. The term graphical element (also referred to as graphical component or simply graphic) means a displayable object which may be partly or totally selected by the user. The term object includes, but is not limited to, an icon, a modeled object, a menu, a vertex, an edge, a face, a feature (for feature-based modeled objects), a geometry, and other graphics . . . . More generally, a graphical element is any information represented on the display; for instance, an object can be represented by a pixel that is the smallest graphical element that can be selected. The object may be a modeled object, e.g. three-dimensional modeled objects modeled with a Computer-Aided Design (CAD) software.

In FIGS. 2-7, it is shown an object 10 with two graphical elements 12, 14 displayed on the touch-sensitive display.

It is to be understood that the steps of the present method are carried out on a graphical user interface (GUI) that is displayed on the touch-sensitive display. The GUI is a graphical interface that allows the users to interact with a computer system. The interactions are generally performed with the menus and the toolbars containing a set of user-selectable icons, each icon being associated with one or more operations or functions, as known in the art. The GUI may further show various types of tools; for example, the GUI of a computer-aided design (CAD) system may comprise graphic tools for facilitating 3D orientation of the object, for triggering a simulation of an operation of an edited product or rendering various attributes of the displayed product. It is to be understood that the present invention can be carried out on any kind of GUI accepting user interactions.

Next, at step S110, a coefficient of reduction of the move distance of the touch pointer is selected. This pointer is displayed within a window to be displayed as a result of the user action of step S120. The coefficient of reduction of the move distance of the pointer allows the user to set the touch pointer sensitivity. This setting is stored from one session to next. Hence, the coefficient of reduction of the move distance may be selected upon user action for a given selection process of a graphical element, or the system can select a default value of said coefficient. It is to be understood that the pointer sensitivity can have any value. It is to be understood that the coefficient of reduction is a parameter of the pointer and that a value of said parameter is selected. Any value may be associated with the coefficient of reduction of the move distance of the pointer. In practice, the user is given option to set pointer sensitivity in the range of 2× to 10× (both inclusive) with increment of 1×. For instance, if the value of the coefficient of reduction is ½, this means that the move distance of the pointer is reduced proportionality by application of this value ½: the displacement of the pointer is two times (2×) reduced compared to the displacement of the user interaction controlling the movement of the pointer.

Next, at step S120, the user performs a first user action: a first user interaction is done on the touch-sensitive display. As a result, a first user location on the touch-sensitive display is detected or determined. The detection of the first location is performed as known in the art. A location is a position, on the touch-sensitive display, where the input causing the user interaction is performed. In general, the touch-sensitive display is a two-dimensional (2D) interface between the user and a space in which the object to select is located. The space may be 2D or 3D space. The input causing the user interaction is thus performed on a 2D interface toward 2D or 3D space. In 2D space, the location of the first user interaction may be for instance determined according to a system of coordinates on the touch-sensitive display. In 3D space, a 3D location of the first user interaction in the 3D space may be computed. The computing of this 3D location in the 3D space may be achieved for instance by a technique of picking as known in the art; for instance ray tracing.

Figure 2:
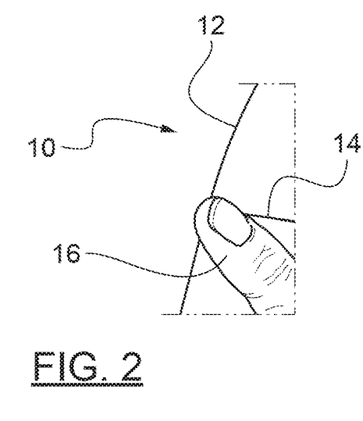
FIG. 2 is a screenshot depicting an example of the invention.

The user interaction is done on the graphical element that the user wants to select, or at least on the neighborhood of the graphical element to be selected—in the event the graphical element is too small for a precise selection. In practice, an appendage is in contact with the touch-sensitive display, e.g. the finger 16 of the user presses the object 10—more precisely the finger location is near the graphical element 14 of the object 10 that the user wishes to select.

A user interaction is an input provided by the user on the touch-sensitive display. The input generates a signal which is transmitted to the computer by the touch-sensitive display. The computer, e.g. personal computer, laptop, music player, cell phone, personal digital assistants, can detect any input or movement or breaking of the input applied on it. Hence, the device has a touch support from Operating System (OS): in addition to hardware (touch screen), the OS running on computer should also support touch interactions. A program will receive touch events from OS, e.g. the GUT displayed on the touch-sensitive display.

The first user interaction is a so-called DOWN event on touch surface of the touch-sensitive display when there is no other touch event on said display. The first user interaction may be maintained on the touch-sensitive display while the next steps are carried out.

Then, at step S130, a window is displayed on the touch-sensitive display. The term window means a graphical control element comprising a visual area containing some of the graphical user interface of the program it belongs to. The window may be shown only after a fixed time elapsed while the user maintains the position of the first user interaction (typically called as HOLD event in the art).

The window comprises the pointer for which the coefficient of reduction has been selected at step S110. The pointer is preferably displayed so that the user can see it; this will facilitate the selection of the graphical element. The pointer is always located inside the window, does move with the window, and cannot be moved outside the window. The pointer thus always remains within the window. The pointer inside the window is different from any other pointer that can be displayed and used in the GUI, e.g. a cursor for launching an application.

Figure 3:
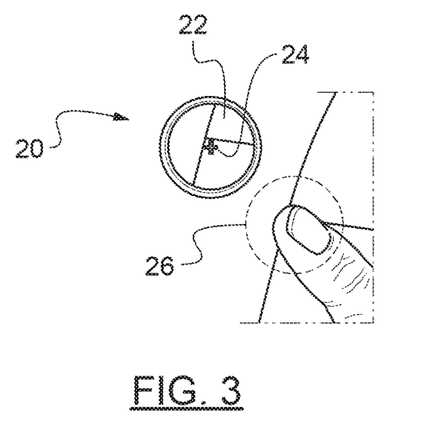
FIG. 3 is a screenshot depicting an example of the invention.
Figure 4:
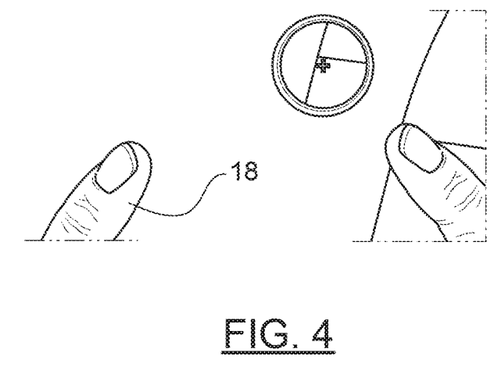
FIG. 4 is a screenshot depicting an example of the invention.

The display of the window and the pointer is triggered upon the first user interaction. For instance, after the user has interacted with the display as shown in FIG. 2, the window 20 and the pointer 24 are displayed as illustrated in FIG. 3. The window is thus a popup window: it appears and disappears based on user interaction.

Still in reference to FIG. 3, the window has a circular shape (a circular ring) and is framed by a window decoration. It is to be understood that any shape can be used, e.g. the window is a rectangle or a square. The window decoration may not be displayed. The pointer is located by default on the center of the window, being understood that the pointer can be positioned at any location within the window when displayed, e.g. a position resulting from a former selection of a graphical element.

Figure 9A:
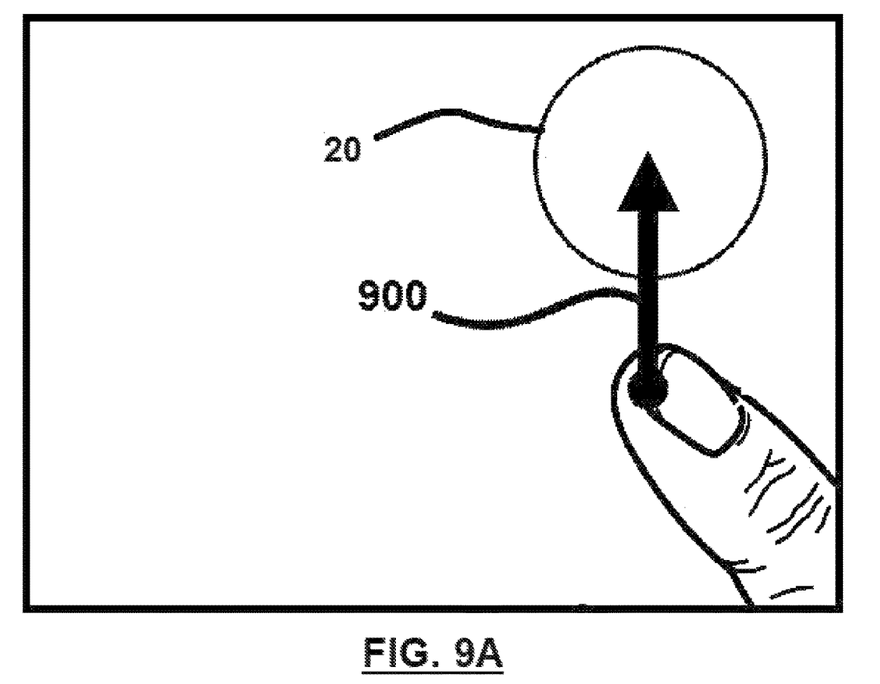
FIG. 9A is a screenshot depicting an example of the invention.
Figure 9B:
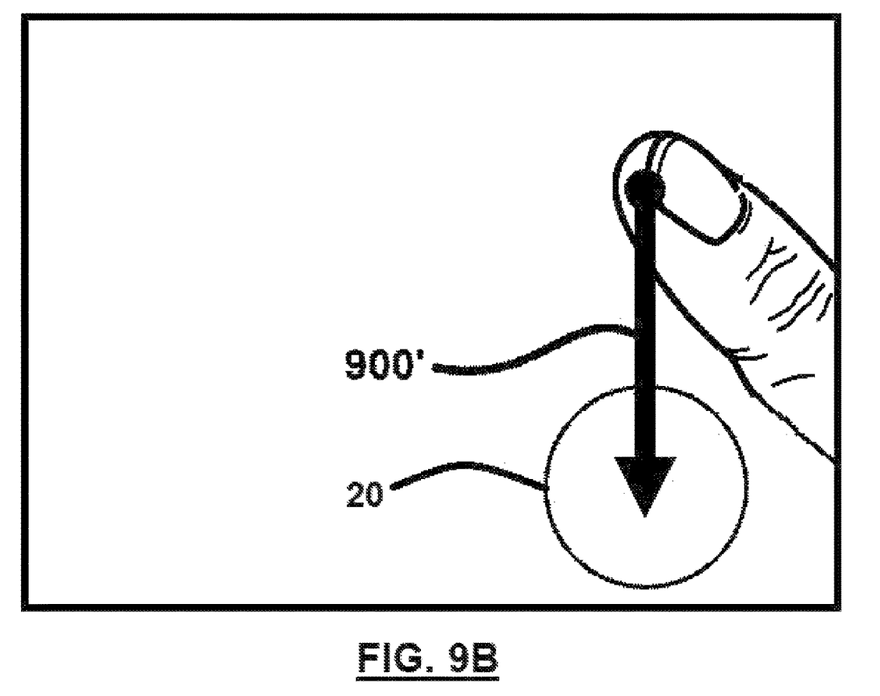
FIG. 9B is a screenshot depicting an example of the invention.

Interestingly, the window is placed on the touch-sensitive display at a predetermined position offset from the location of the first user interaction. For instance, a predetermined direction and distance from the first user interaction may be used for obtaining the position of the window. Typically, the direction and distance are selected such that the window is placed in the neighborhood of the first user interaction. For instance, in the example of FIG. 3, the distance between the window 20 and the first location of the finger 16 cannot exceed a predetermined number of pixel (the distance might be also a Euclidian distance) and the window is placed on the left of the finger 16. The window is thus in the field of vision of the user, and the hand of the finger 16 (here the right hand) does not hide the window; the user can thus see the next operations performed for selecting a graphical element. The predetermined direction and distance may be customized upon user action. For instance, if the user is left handed, he might prefer the window to be placed on the right of the finger 16; or when the finger is near the left/right/top/bottom edge of the display area (predetermined direction 900 in FIG. 9A) the window is placed at the right/left/bottom/top of the finger respectively (inverse predetermined direction 900' in FIG. 9B). Or when the secondary touch interaction at step S150 and step S160 is close to the window, the window moves appropriately not to hinder with secondary touch interaction.

Then, at step S140, an area surrounding the first location of the first user interaction is rendered within the window displayed at step S130. Said otherwise, a part of the content displayed around the first location is reproduced (or displayed) in the window. In practice, the predetermined area surrounding the first location has the same surface area that the one of the window, so that there is no magnification in the window. Hence, the content displayed in the window is the same as the one the window (not framed by the window decoration) would recover if centered on the first location; for instance, the barycenter of the window coincides with the first location.

There may be magnification in the window; in this case, the area surrounding the first location is reduced compared to the general case without magnification. The magnification coefficient (also referred to as magnification ratio) may be fixed, or it may be selected upon user action, e.g. when the user selects the coefficient of reduction of the move distance at step S110. Magnification means that the area rendered and displayed in the window is enlarged in appearance compared to the area displayed at step S100. Inversely, the display in the window may be reduced based on reduction coefficient (also referred to as reduction ratio), e.g. selected upon user action at the step S110.

In the absence of magnification, the content displayed in the window is a copy of the content already displayed on the touch screen; the consumption of computing resources is thus limited compared to the case wherein there is magnification.

In FIG. 3, the window 20 reproduces the content within the dotted circle 26. The window 20 and the dotted circle 26 have the same diameter and the same area. The dotted circle delimits the area surrounding the first location of the first user interaction, and is centered on the first location. Here the circle 26 is represented for illustration purpose only.

Next, at step S150, a second user interaction is detected on the touch-sensitive display. This step is performed the same way as the step S120. In practice, an appendage is in contact with the touch-sensitive display, e.g. the second finger 18 of the left hand of the user presses touch screen as illustrated on FIG. 4. Preferably, the second user interaction is not located on the first location and not performed on the window.

Then, at step S160, a move of the second user interaction is detected on the touch-sensitive display, and the pointer is moved within the window according to the move of the second user interaction. The move or displacement of the second user interaction is typically a slide of the second user interaction on the touch-sensitive display. Here sliding means that the second user interaction is always detected (that is, continuously in contact with the touch-sensitive display) while the displacement is carried out.

The move of the second user action comprises a move distance and a move direction. It may also comprise a move acceleration, as known in the art. The pointer is moved in the same move direction as the one of the second user interaction, as known in the art. The move distance of the pointer is proportional to the move distance of the second user interaction. This means that the pointer may travel the same distance, a larger distance or a smaller distance than the distance traveled by the second user interaction. In practice, the move distance of the pointer is reduced so that the user can more easily move the pointer over the graphical element to be selected. This allows the user to perform more accurate selection. To this aim, the move distance of the pointer is reduced by the use of the coefficient of reduction selected at step S110.

Figure 5:
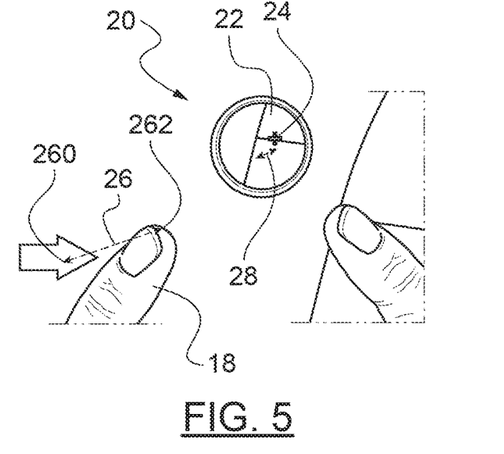
FIG. 5 is a screenshot depicting an example of the invention.
Figure 6:
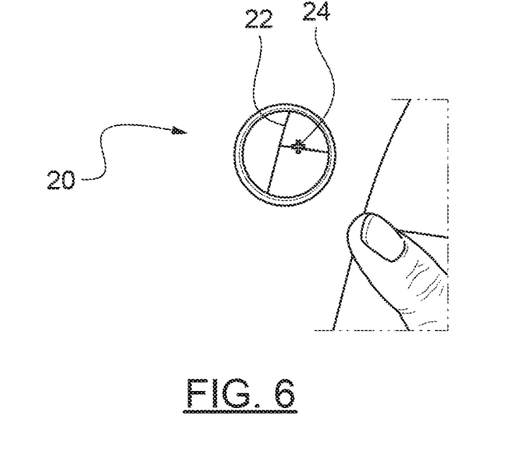
FIG. 6 is a screenshot depicting an example of the invention.
Figure 7:
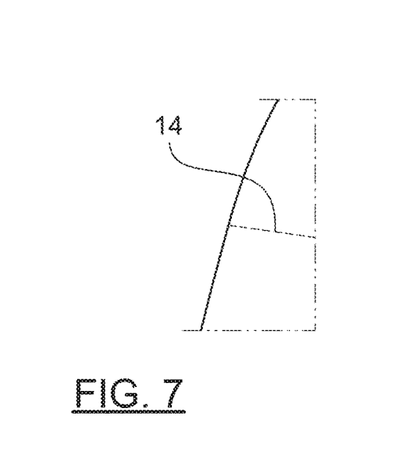
FIG. 7 is a screenshot depicting an example of the invention.

FIG. 5 illustrates the step S160. The second user interaction is created by the finger 18 sliding from a first location 260 to a second location 262. The move of the second user interaction is represented by the dotted arrow 26. The pointer 24 has followed the direction of the displacement of the second user interaction, but it traveled on a smaller distance as the move distance of the pointer is reduced by the application of the coefficient of reduction previously selected. The move of the pointer is represented by the dotted arrow 28. Hence, the control of the movement of the pointer is more accurate thanks to the application of the coefficient of reduction on the displacement of the pointer. The dotted arrows 26 and 28 are added for the illustration purpose only.

The move of the pointer is performed in real-time, that is, the pointer is displaced in the same time the displacement of the second user interaction is detected. In practice, a touch-sensitive display comprises a grid of touchscreen sensors forming the haptic device 1090, and the move of the second user interaction is discretized in a set of locations, each location corresponding to a sensor activated by the user interaction. Hence, for each activated sensor, a new location of the second user interaction is computed, and the pointer is moved such that its new position reflects the new location of the second user interaction. By this way, the pointer follows in real-time the displacement of the second user interaction.

At this step of the process, the user can be satisfied by the position of the pointer: the pointer is over the graphical element he/she wants to select. When the pointer is over a graphical element, that graphical element can be selected—it is in a preselected state—; it may be emphasized so that the user can easily see which graphical element among the displayed graphical elements can be selected. For instance, the emphasizing may be carried out thanks to the highlight of the graphical element. A highlight consists in applying on the representation an emissive and light colour. The emphasizing may also be performed by other visual effects such as blinking of the graphical element, thickening the outline of the emphasized graphical element, or increasing the density of points forming the outline of the emphasized graphical element. By the way, any means which allows the user to distinguish the selectable graphical element among the others may be used.

The user has a second possibility to perform a preselection of a graphical element which is to use the first user interaction in order to bring the graphical element to be selected under the pointer. At this step of the process, the second user interaction is still detected, e.g. the finger 18 is still in contact with the touch-sensitive display.

At step S170, a move of the first user interaction is detected, the move starting from the first location to be terminated at a second location on the touch-sensitive display. This detection step is performed the same way as for the detection step of the second user interaction at step S160.

When the first user interaction is on the second location, the area surrounding the second location on the touch-sensitive display is rendered in the window. The rendering is performed the same as discussed in reference to step S140.

Preferably, the rendering in the window is a real-time rendering of areas surrounding the location of the first user interaction while moving from the first to the second location (S180). This real-time rendering is similar to real-time move of the pointer; the move of the first user interaction is discretized in a set of locations, each location corresponding to a sensor activated by the user interaction. And for each activated sensor, a new location of the first user interaction is computed, and the rendering of the area surrounding the new location of the first user interaction is displayed in the window. By this way, the rendering in the window follows in real-time the displacement of the first user interaction.

Interestingly, the window moves according to the move of the first user interaction, and while the first user interaction moves. This means that the window is positioned on the GUI the same way as discussed in reference to step S130: the window is placed on the touch-sensitive display at predetermined position offset from the new location of the first user interaction.

Advantageously, the pointer in the window remains motionless within the window while the window moves and the rendering in the window is updated; despite the second user interaction is still detected while the first user interaction moves. This advantageously allows the system to tolerate displacements of the second user interaction that the user would create (voluntarily or not). Hence, once the user has moved and placed the pointer in the window, the pointer retains its position and the user adjusts the position of the graphical element by moving the first user interaction until the graphical element is under the pointer. Interestingly, the user can successively move the second and first user interactions until the pointer is over the graphical element to be selected, that is, the graphical element is in the preselected state. The user can thus use both user interactions in order to make the selection of an object. This is particularly ergonomic for the user that may choose to move either finger as per the ease and convenience allowed by the current configuration of the fingers on the screen to make the preselection.

Then, at step S190, the user selects the graphical element that is in the preselected state. For instance, the user can stop the second user interaction, e.g. the finger 18 is removed from the touch-sensitive display (known as UP event in the art). Alternatively, the selection of the graphical element over which the pointer is located can be triggered when the first and second user interaction are no more detected, that is, when their loss is detected. The loss of detection means that the user interaction has been released by the user, e.g. the user removes his fingers 16, 18 from the touch-sensitive display. As another example, the selection can be automatically performed when the pointer stay immobile over the graphical element for a given period of time. It is to be understood that the selection of the graphical element may be triggered by any other way.

Once a graphical element has been selected, the user can perform a further selection of a graphical element: (i) if the first user interaction has been maintained by the user, by creating a new second user interaction and moving the already displayed pointer over a second graphical element already displayed in the window; (ii) if both the first and second user interactions have been removed, by performing again the steps S100 to S160.

Then, at step S200, the window is removed from the touch-sensitive display, that is, the window is no more displayed. The removal may be performed immediately after that the graphical element has been selected. The window may not be removed after selection; particularly if selection is automatic by long hold. In practice, the window should disappear only when the first user interaction is removed. This advantageously allows selecting multiple elements by successive moves of first/second user interactions without starting over from the first interaction for each selection.

The selected graphical element may be represented with a particular rendering so that the user can see that the graphical element is selected. This is illustrated on FIG. 7 wherein the selected graphical element 14 is rendered in dotted line.

The present method may be used for deselecting a graphical element. The pointer is moved over an already selected graphical element and the displacement(s) of the pointer is performed according to the same principles discussed in relation with FIG. 1. The selected graphical element is unselected, e.g. when the pointer stay immobile over the selected graphical element for a given period of time.

The preferred embodiment of the present invention has been described. It will be understood that various modifications may be made without departing from the spirit and scope of the invention. Therefore, other implementations are within the scope of the following claims. For instance, the first user interaction and the second user interaction are performed by the contact on the touch-sensitive display of two fingers 16, 18 and each finger belongs to one respective hand of the user. Conversely, the user may use fingers that belong to only one hand. Alternatively, two users may work together on the same GUI and collaborate, for instance during the design process of a modeled object that generally requires the selection of graphical elements; the first user interaction may be performed by one user and the second user interaction may be performed by the second user. The user can also perform successively pre-selections of the several graphical elements as depicted in steps S100 to S160 or S100 to S190—for instance a graphical element is preselected when the pointer is over said graphical element for a given time period—, and selects all the preselected graphical element at once.

The invention claimed is:

1. A computer-implemented method for selecting a graphical element of a 3D object modeled on a computer-aided design (CAD) system, the graphical element being displayed on a touch-sensitive display, the method comprising:

displaying the graphical element on the touch-sensitive display;

detecting a first location of a first user touch of a user on the touch-sensitive display, the first user touch being on the graphical element or in a predetermined neighborhood of the graphical element;

displaying on the touch-sensitive display a window in a predetermined direction and distance offset from the first location of the first user touch, the predetermined direction being predetermined based on a dominant hand of the user, the predetermined direction being inversed when the first location is near an edge of the touch-sensitive display and the predetermined direction directs the window outside of the touch-sensitive display, such that the first user touch does not hide the window even if the first user touch is maintained on the touch-sensitive display and such that the dominant hand of the user does not hide the window when the first location is not near an edge of the touch-sensitive display, the window comprising a pointer for selecting the graphical element when the pointer is over the graphical element;

during the displaying, rendering in the window an area surrounding the first location of the first user touch and determining that the graphical element displayed in the window is not in a preselected state at this time; and successively performing, until the graphical element is in the preselected state:

(i) a first operation comprising:

detecting a second user touch on the touch-sensitive display, detecting a move of the second user touch on the touch-sensitive display, and moving, within the window, the pointer according to the move of the second user touch; and (ii) a second operation comprising:

detecting a move of the first touch from the first location to a second location on the touch-sensitive display, and rendering in the window an area surrounding the second location on the touch-sensitive display, the pointer in the window remaining motionless within the window while the window moves and the touch-sensitive display in the window being updated even if a displacement of the second touch is still detected, wherein the move of the first touch and the move of the second touch are slides on the touch-sensitive display, and the graphical element is in the preselected state when the pointer is over the graphical element.

2. The computer-implemented method of claim 1, wherein the move of the second user touch comprises a move direction and a move distance, and the pointer is moved with a same move direction and with a move distance that is proportional to the move distance of the second user touch.

3. The computer-implemented method of claim 2, wherein the move distance of the pointer is reduced proportionally by an application of a coefficient of reduction.

4. The computer-implemented method of claim 3, further comprising:

selecting, upon user action, the coefficient of reduction.

5. The computer-implemented method of claim 1, wherein rendering in the window the area surrounding the second location on the touch-sensitive display further comprises performing, in the window, a real-time rendering of areas surrounding intermediate locations of the first user touch while moving from the first to the second location.

6. The computer-implemented method of claim 1, further comprising:

moving the window according to the move of the first user touch.

7. The computer-implemented method of claim 1, wherein the second user touch is maintained on the touch-sensitive display.

8. The computer-implemented method of claim 1, wherein the first user touch is maintained on the touch-sensitive display.

9. The computer-implemented method of claim 1, further comprising after moving the pointer:

detecting loss of the first and second user touches; and selecting a graphical element under the pointer.

10. The computer-implemented method of claim 9, further comprising:

removing the window from the touch-sensitive display.

11. The computer-implemented method of claim 1, wherein an area rendered in the window is magnified or reduced based on a magnification or a reduction ratio.

12. A non-transitory computer readable medium having stored thereon a computer program comprising instructions for causing a computer to implement the method according to claim 1.

13. A computer system for selecting a graphical element of a 3D object modeled on a computer-aided design (CAD) system, the computer system comprising:

processing circuitry communicatively coupled to a memory, and a touch-sensitive display, the memory storing instructions causing the processing circuitry to be configured to display the graphical element on the touch-sensitive display, detect a first location of a first user touch of a user on the touch-sensitive display, the first user touch being on the graphical element or in a predetermined neighborhood of the graphical element, display on the touch-sensitive display a window in a predetermined direction and distance offset from the first location of the first user touch, the predetermined direction being predetermined based on a dominant hand of the user, the predetermined direction being inversed when the first location is near an edge of the touch-sensitive display and the predetermined direction directs the window outside of the touch-sensitive display, such that the first user touch does not hide the window even if the first user touch is maintained on the touch-sensitive display and such that the dominant hand of the user does not hide the window when the first location is not near an edge of the display, the window comprising a pointer for selecting the graphical element when the pointer is over the graphical element, during displaying, render in the window an area surrounding the first location of the first user touch and determine that the graphical element displayed in the window is not in a preselected state at this time, and successively perform, until the graphical element is in the preselected state:

(i) a first operation comprising:

detecting a second user touch on the touch-sensitive display, detecting a move of the second user touch on the touch-sensitive display, and moving, within the window, the pointer according to the move of the second user touch, and (ii) a second operation comprising:

detecting a move of the first touch from the first location to a second location on the touch-sensitive display, and rendering in the window an area surrounding the second location on the touch-sensitive display, the pointer in the window remaining motionless within the window while the window moves and the display in the window being updated even if a displacement of the second touch is still detected, wherein the move of the first touch and the move of the second touch are slides on the touch-sensitive display, and the graphical element is in the preselected state when the pointer is over the graphical element.

* * * * *